Figure 1:
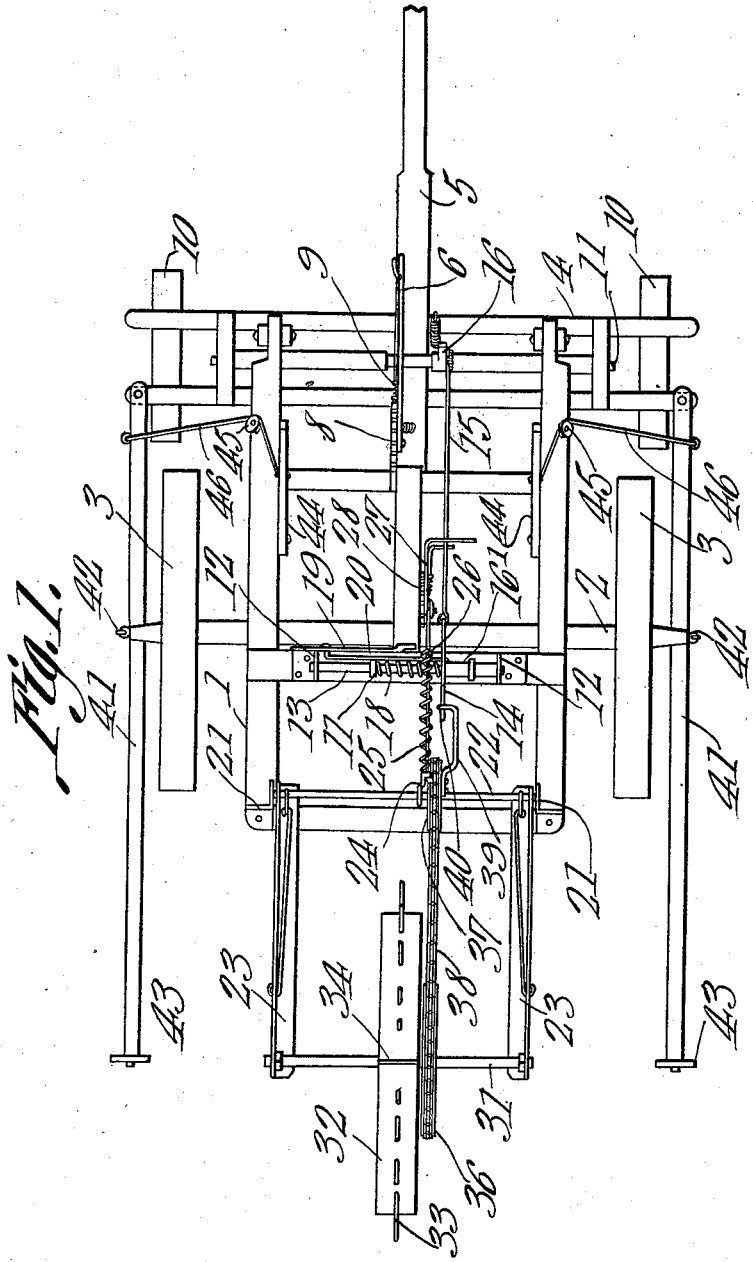

L. A. ANFINSON.
WIRELESS CHECK ROW CORN PLANTER.
APPLICATION FILED DEC. 22, 1910.

1,000,705.

Patented Aug. 15, 1911.
2 SHEETS—SHEET 1.

Witnesses

Inventor
L. A. Anfinson
by C. A. Snow & Co.
Attorneys

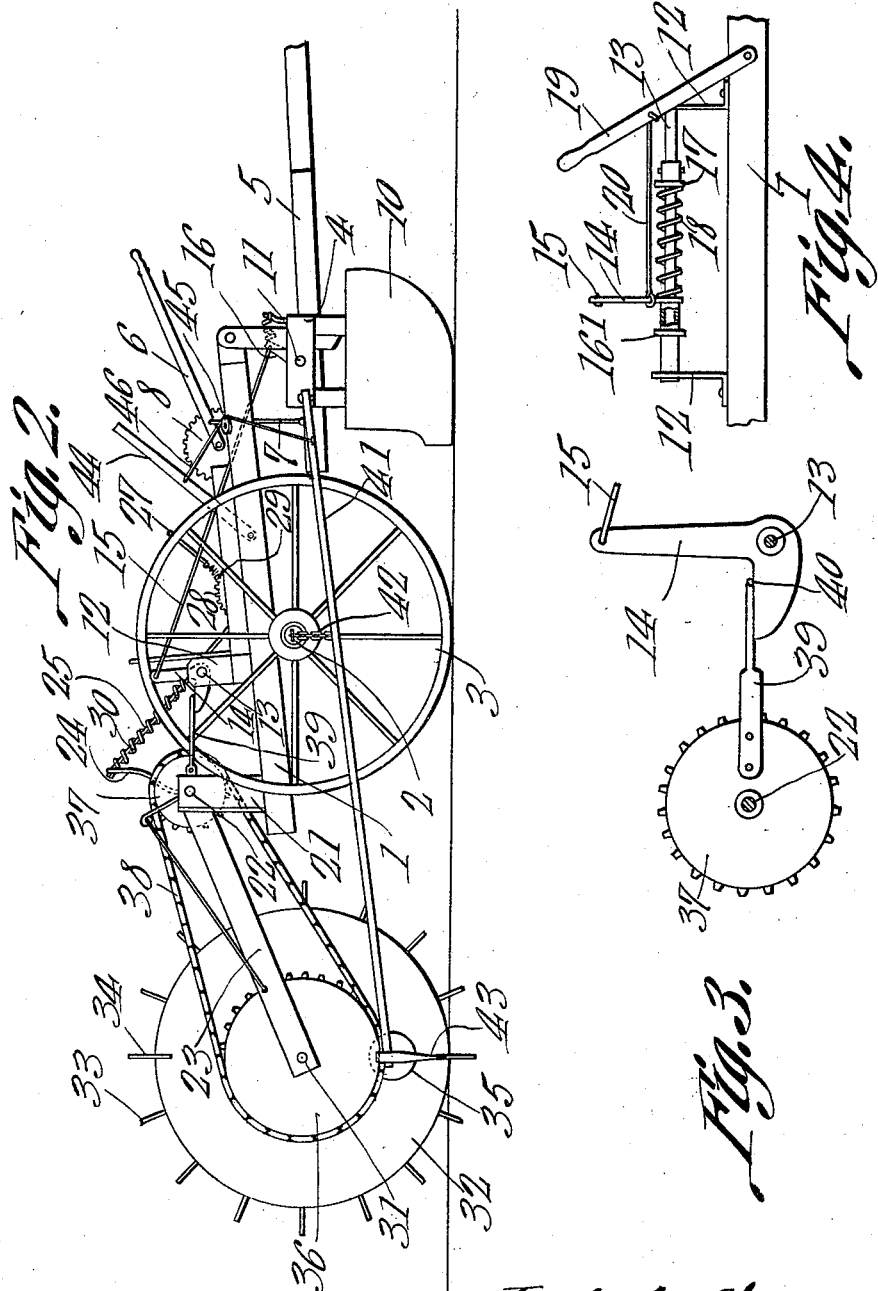

UNITED STATES PATENT OFFICE.

LARS A. ANFINSON, OF CLERMONT, IOWA.

WIRELESS CHECK-ROW CORN-PLANTER.

1,000,705.            Specification of Letters Patent.    Patented Aug. 15, 1911.

Application filed December 22, 1910. Serial No. 598,764.

*To all whom it may concern:*

Be it known that I, LARS A. ANFINSON, a citizen of the United States, residing at Clermont, in the county of Fayette and State of Iowa, have invented a new and useful Wireless Check-Row Corn-Planter, of which the following is a specification.

This invention has relation to wireless check-row corn planters and consists in the novel construction and arrangement of its parts hereinafter described and claimed.

The object of the invention is to provide in a planter of the character indicated, a means which may be operated in response to the attraction of gravity for advancing the time of the dropping operation of the planter in order that when the machine makes a turn at the end of a row and starts back upon another row, the advancing mechanism may be operated whereby the dropping operation is caused to occur in check-rows transversely across the field.

With the above object in view, the shaft that operates the dropping mechanism of the planter is operatively connected with a lever which is fulcrumed upon the planter frame and which normally is located in the path of movement of an arm carried by a wheel which in turn is operatively connected with a traction wheel. The said traction wheel is weighted at one side so that its center of gravity is not at its actual center and the said wheel is provided upon its periphery with blades adapted to make indicating incisions in the soil. These blades are at diametrically opposite sides of the wheel and are also in alinement with the diameter that passes through the center of the wheel and the point of the center of gravity thereof. The above mentioned wheel is journaled in a pivoted frame and a lever mechanism is provided for swinging the said frame vertically. A lever mechanism is also provided for shifting the first mentioned lever laterally in order that it may be carried beyond the path of movement of the arm mounted upon the first mentioned wheel.

In the accompanying drawings: Figure 1 is a top plan view of a planter. Fig. 2 is a side elevation of the same. Fig. 3 is a detailed side elevation of a portion of the mechanism of planters. Fig. 4 is a side elevation of a lever mechanism adapted to shift the first mentioned lever mechanism.

The planter consists of a frame 1 which is mounted on an axle 2 which in turn is mounted upon ground wheels 3 in the usual manner. A hopper frame 4 is pivotally connected with the forward portion of the frame 1 but in the interest of clearness the hoppers have been eliminated in the illustration. A draft tongue 5 is connected with the hopper frame 4 and a lever 6 is mounted upon the frame 1 and is connected with the hopper frame 4 by means of a link 7. A gear segment 8 is mounted upon the frame 1 adjacent the lever 6 and the said lever is provided with a spring actuated pawl 9 which is adapted to engage the gear teeth of the segment 8. By this arrangement it will be seen that means are provided for raising or lowering the hopper frame 4 with relation to the frame 1. The parts are so arranged and proportioned that when the hopper frame 4 is lowered the runners or furrow openers 10 will enter the surface of the soil and open furrows therein in the usual manner. It is to be understood that it is in these furrows that the seed is deposited during the planting operation. A shaft 11 is journaled upon the hopper frame 4 and the said shaft serves as means for operating the seed dropping mechanisms of the hoppers (not shown).

Standards 12 are mounted upon the frame 1 and a shaft 13 is carried by the said standards. A bell crank lever 14 is pivotally mounted upon the shaft 13 and one end of the said lever is connected by means of a rod 15 with an arm 16 which is fixed to the shaft 11. The bell crank lever 14 is also slidably mounted upon the shaft 13 and is limited in its sliding movement in one direction by a stop 16' which is fixed to the said shaft. A stop 17 is also fixed to the shaft 13 and a coiled spring 18 surrounds the shaft 13 and at one end bears against the stop 17 and at its other end bears against the bell crank lever 14. The spring 18 is under tension with a tendency to hold the bell crank lever 14 against the stop 16'. A lever 19 is fulcrumed upon the frame 1 and a rod 20 operatively connects the said lever with the bell crank lever 14. The connection between the rod 20 and the lever 19 and the bell crank lever 14 are sufficiently loose to permit the bell crank lever 14 to be slid along the shaft 13 when the lever 19 is swung upon its fulcrum. By this arrangement means are provided for drawing the bell crank lever 14 away from the stop 16' and out of the path of an arm (to be explained) which arm serves as means for swinging the said bell crank lever at intervals and through the said bell crank lever operating the seed dropping mechanism as indicated.

Standards 21 are mounted upon the rear portion of the frame 1 and carry a shaft 22. The shaft 22 is journaled in the standards 21 and rearwardly disposed parallel arms 23 are fixed at their forward ends to the said shaft 22. An arm 24 is fixed at its lower end to the intermediate portion of the shaft 22 and at its upper end loosely receives a rod 25. The said rod 25 passes through a blade 26 mounted upon the frame 1 and at its forward end is connected with a lever 27 which is fulcrumed upon the frame 1. A gear segment 28 is mounted upon the frame 1 adjacent the lever 27 and the said lever is provided with a spring pawl 29 which engages the teeth of the segment 28. A coiled spring 30 surrounds the rod 25 and is interposed between the guide 26 and the upper end of the arm 24. The spring 30 is under tension with a tendency to hold the arm 24 away from the guide 26. A shaft 31 is journaled for rotation at the rear end portions of the arm 23 and a wheel 32 is fixed to the intermediate portion of the said shaft. The wheel 32 is provided upon its periphery with a series of tractors 33 and at diametrically opposite sides with soil incising blades 34. The wheel 32 is also provided in its side at a point between its center and its periphery with a weight 35 which is located in diametrical alinement with the soil incising blades 34. Considering the said weight 35 as a portion of the wheel, the presence of the weight places the center of gravity of the wheel to one side of its center. A sprocket wheel 36 is fixed to the shaft 31 and a sprocket wheel 37 is loosely journaled upon the shaft 22. A sprocket chain 38 is trained around the sprocket wheels 36 and 37 and is adapted to transmit rotary movement from the shaft 31 and wheels 32 to the wheel 37. An arm 39 is fixed to the side of the wheel 37 and is provided with an angularly disposed extremity 40 in the path of movement of which one end portion of the bell crank lever 14 normally lies. When however the said lever 14 is shifted laterally along the shaft 13 by the lever mechanism 19, the said bell crank lever is moved to one side of the path of movement of the angularly disposed extremity 40 of the arm 39 and consequently the rotation of the said arm about the axis of the shaft 22 can have no operative influence upon the bell crank lever 14.

Gage staffs 41 are pivotally connected at their forward ends with the end portions of the hopper frame 4 and extend rearwardly under the projecting end portions of the axle 2. Flexible connections 42 connect the said staffs with the end portions of the said axle in order to prevent excessive lateral swinging movement on the part of the said staffs. Gage points or blades 43 are fixed to the rear ends of the staffs 41 and at their lower ends are in approximate alinement with vertical plane passing through the center of the wheel 32. Levers 44 are fulcrumed upon the frame 1 and pulleys 45 are journaled upon the said frame. Chains or cables 46 are connected at their inner ends with the levers 44 and are about the pulleys 45 and at their outer ends are connected with the forward end portions of the staffs 41. By means of the levers 44 and cables 45 provision is made for holding the rear end portions of the staffs 41 so that the lower ends of the gages 43 are held in their proper places.

When the planter arrives at the end of a row and prior to turning the same the operator swings the lever 6 so that the hopper frame 4 and the runners 10 are elevated. At or about the same time he also swings the lever 19 so that the bell crank lever 14 is carried out of the path of movement of the angularly disposed extremity 40 of the arm 39. Previous to this however, the levers 44 have been swung so that the rear end portions of the staffs 41 together with the gages 43 are held in elevated position. After the planter has been turned around and a new row of planting is about to be started, the operator swings one of the levers 44 whereby one of the gage staffs 41 together with the attached gage 43 is permitted to descend so that the said gage will come in contact with the soil. The machine is then started along the return row until the said lowered gage 43 is directly over an incision made in the soil by one of the blades 34 carried by the wheel 32 upon its preceding trip. The operator then swings the lever 27 and through the connecting rod 25 and arm 24 the shaft 22 is partially rotated whereby the rear portions of the arms 23 are raised. Inasmuch as the bell crank lever at this time is out of the path of movement of the angular extremity 40 of the arm 39, the wheel 32 is free to rotate under the influence of gravity upon the weight 35 at one side of the center of the said wheel. Thus the said wheel 32 will be turned so that the weight 35 will be between the center of the wheel and the surface of the ground and consequently one of the incision blades 34 will be directly positioned above the surface of the ground and will be in alinement transversely of the rows being planted with the gage 43. At this time the wheel 37 has been turned to such an extent that the arm 39 carried thereby, has its angular extremity so positioned as to engage one end portion of the bell crank lever 14 if the said lever is in the path of movement of the said extremity. If not the operator swings the lever 19 whereby the rod 20 is moved longitudinally and the said bell crank lever 14 is moved along the shaft 13 under the influence of the spring 18 until one end portion of the said lever is in the path of movement of the angular extremity 40 of the arm 39. The said extremity 40 at this time is directly over the end of the lever 14 and about to actuate the same. In view of the fact that the incision blade 34 is now in contact with the ground and in check-row alinement with the gage 43 it is apparent that as the machine is started back on the return row the intervals at which the seed are planted by the planter will correspond with the intervals of all previous rows planted in consequence of the same. Therefore it will be seen that a simple and effective means is provided for maintaining the planting throughout the field in check-row alinement without the use of wire or other accessories not carried upon the frame of the planter.

Having described the invention, what I claim as new and desire to secure by Letters Patent is:

1. In a planter comprising a shaft for operating seed dropping devices, means cooperating with said shaft comprising a bell crank lever fulcrumed upon the planter frame and operatively connected with the shaft, a lever mechanism for shifting the said bell crank lever, a frame pivotally connected with the planter frame, means for raising the last mentioned frame, a traction wheel journaled in said frame and having soil incising blades, a weight attached to the traction wheel and positioning its center of gravity to one side of its actual center, a wheel journaled upon the planter frame and carrying an arm, means for operating the last mentioned wheel from the traction wheel, said bell crank lever normally lying in the path of movement of the said arm.

2. In a planter having a shaft adapted to operate seed dropping mechanisms, a bell crank lever fulcrumed upon the frame of the planter and operatively connected with the said shaft, means for shifting the said bell crank lever laterally, a frame pivotally connected with the planter frame, a lever mechanism for raising the last mentioned frame, a traction wheel journaled in the last mentioned frame, a wheel journaled upon the planter frame, an arm attached to the last mentioned wheel and having a laterally disposed extremity in the path of movement of which the bell crank lever normally lies, and means for operating the last mentioned wheel from the said traction wheel.

3. In a planter including a shaft adapted to operate seed dropping mechanisms, a bell crank lever fulcrumed upon the frame of the planter and operatively connected with said shaft, a frame pivotally connected with the planter frame, a lever mechanism mounted upon the planter frame and operatively connected with the last mentioned frame, means for shifting the bell crank lever laterally, a traction wheel journaled in the last mentioned frame, a wheel journaled upon the planter frame and operatively connected with the traction wheel, an arm carried by the last mentioned wheel, said bell crank lever normally lying in the path of movement of said arm, incision blades carried at diametrically opposite sides of the said traction wheel, and a weight carried by the said traction wheel and positioned in the center of gravity at one side of its actual center.

In testimony that I claim the foregoing as my own, I have hereto affixed my signature in the presence of two witnesses.

LARS A. ANFINSON.

Witnesses:
R. P. BERRY,
J. A. ERICKSON.

Copies of this patent may be obtained for five cents each, by addressing the "Commissioner of Patents, Washington, D. C."